United States Patent

Wurz et al.

[11] Patent Number: 5,547,034
[45] Date of Patent: Aug. 20, 1996

[54] CONVEYOR FRICTION SCALE

[75] Inventors: Albert Wurz, Doylestown; William Scott, Sellersville; Richard Skokowski, Green Lane, all of Pa.

[73] Assignee: Accu-Sort Systems, Inc., Telford, Pa.

[21] Appl. No.: 179,422

[22] Filed: Jan. 10, 1994

[51] Int. Cl.⁶ .......................... G01G 19/22; G01G 13/02; G01N 3/56
[52] U.S. Cl. .................... 177/25.13; 177/1; 177/119; 177/145; 73/9
[58] Field of Search ............................ 177/16, 119, 120, 177/121, 25.13, 1, 50, 145; 73/9

[56] References Cited

U.S. PATENT DOCUMENTS

| Re. 29,944 | 3/1979 | Hyer et al. ........................ 177/121 |
|---|---|---|
| 3,115,201 | 12/1963 | Brumbaugh ........................ 177/16 |
| 3,559,451 | 2/1971 | Hyer et al. ........................ 73/1 |
| 3,610,908 | 10/1971 | Karosas ........................ 235/183 |
| 3,847,268 | 11/1974 | Duell ........................ 198/40 |
| 3,960,225 | 6/1976 | Hyer et al. ........................ 177/121 |
| 4,126,196 | 11/1978 | Hyer et al. ........................ 177/121 |
| 4,134,465 | 1/1979 | Takahama et al. ........................ 177/16 |
| 4,276,112 | 6/1981 | French et al. ........................ 156/360 |
| 4,392,535 | 7/1983 | Fujii et al ........................ 177/1 |
| 4,526,244 | 7/1985 | Chauveau ........................ 177/1 |
| 4,600,065 | 7/1986 | Morris ........................ 177/123 |
| 4,729,442 | 3/1988 | Sichet ........................ 177/50 |
| 4,765,488 | 8/1988 | Moriarity ........................ 209/551 |
| 5,097,696 | 3/1992 | Le Compagnon ........................ 73/9 |
| 5,101,982 | 4/1992 | Gentili ........................ 209/556 |
| 5,119,893 | 6/1992 | Jost ........................ 177/16 |
| 5,178,227 | 1/1993 | Kvisgaard et al. ........................ 177/145 |
| 5,308,930 | 5/1994 | Tokutu et al. ........................ 177/25.13 |
| 5,393,939 | 2/1995 | Nasuta, Jr. et al. ........................ 177/145 |

FOREIGN PATENT DOCUMENTS

| 534803 | 10/1958 | Belgium . | |
|---|---|---|---|
| 0120813 | 10/1984 | European Pat. Off. | ........ G01G 11/00 |
| 0592349 | 4/1994 | European Pat. Off. | ........ G01G 11/00 |
| 2557518 | 7/1976 | Germany | ........ G01G 11/04 |
| 58-113722 | 7/1983 | Japan | ........ G01G 11/00 |
| WO9005285 | 5/1990 | WIPO . | |

Primary Examiner—Peter S. Wong
Assistant Examiner—Randy W. Gibson
Attorney, Agent, or Firm—Volpe and Koenig, P.C.

[57] ABSTRACT

A conveyor scale assembly for use in combination with a conveyor belt for weighing an article on the moving conveyor belt. The conveyor scale assembly is comprised of a slider bed which contacts the underside of the moving conveyor belt which generates a friction force between the conveyor belt and the slider bed. Attached to the slider bed is a sensor which continuously measures the friction force and transmits data representing the measured friction force. A CPU receives and processes the representative data and provides a weight for the article on the conveyor belt.

6 Claims, 7 Drawing Sheets

CONVEYOR FRICTION SCALE

BACKGROUND OF THE INVENTION

1. Field of the Invention

The present invention relates to a weighing system for conveyor borne articles. More particularly, the present invention relates to a weighing system for a high speed conveyor. Most particularly, the present invention provides a scale which weighs a conveyed article based upon the increase in conveyor belt friction due to the article's weight.

2. Description of the Prior Art

Industry has pressed automated package handling as a means to increase efficiency. This has been done largely through automated package identification by bar code labeling and automated sortation by scanners identifying the labels and routing the packages to the proper shipping area. However, one of the most common determining factors in material handling and sorting is package weight. Weight is an especially significant factor for the shipping industry where shipping fees are directly related to package weight. Little progress has been made in providing an automated means for accurately weighing conveyor borne packages as they travel at high speed through automated package identification and sorting systems.

The task of weighing packages to determine proper handling and/or labeling remains a low speed or manual operation. This does not present a problem for individuals or small businesses where the volume of materials handled is low. However, for larger businesses it would be desirable to have an automated means for accurate and high speed weighing of articles as they are carried by a conveyor for labeling and/or sorting.

Additionally, when individuals or small businesses ship packages through a local shipping office, this does not present as much of a problem to the shipping industry because the package is weighed and the shipping fees are paid directly to the carrier. However, the majority of package shipping originates from mail order businesses or companies which ship packages in large quantities. These bulk shippers generally have in-house facilities for weighing and labeling packages. In order for a shipping company to verify a package weight and the associated shipping costs, each package must be reweighed during shipping.

Typically, the shipping company transports the packages to a central location. The packages are then sorted by label as they move through a system of conveyor belts to the proper shipping areas. In order to verify shipping costs, the actual package weight can be measured and tracked against each shipping label. The volume of packages being handled at these locations renders manual weighing too time consuming.

The known conveyor weighing systems are generally not sensitive enough for high speed, accurate in-line weight verification of conveyor borne packages of mixed weights. This is due mainly to the fact that known systems generally measure the weight of an entire conveyor section, including the belt, pulleys, drives and supporting structure, along with the package, and then subtract the known weight of the conveyor section to calculate the package weight. This creates a speed limitation due to the time required to allow vibrations in the large resident mass to dampen or settle. It has been found that a scale of this type requires approximately 0.3 seconds to settle enough to get an accurate weight reading.

U.S. Pat. No. 4,276,112 illustrates one known conveyor scale. The conveyor includes a weighing section which calculates the weight of an object moving on the conveyor by taking the entire weight of the weighing conveyor section and the object and subtracting the known fixed weight of the conveyor to arrive at the package weight.

U.S. Pat. No. 4,729,442 teaches a similar system for weighing products on a conveyor by weighing an entire section of the conveyor along with the conveyed products.

U.S. Pat. No. 4,765,488 teaches a system of conveyors for sorting items by weight. This system utilizes conveyor belt weighing sections in which the entire conveyor belt section is weighed along with the conveyed object.

Due to the large resident mass of the scale components, these prior art systems generally do not provide the required sensitivity for weighing smaller packages travelling at high speed. Thus, the potential for error, along with the requirement for manual weight confirmation, is increased.

SUMMARY OF THE INVENTION

The present invention provides a conveyor scale assembly for use in combination with a conveyor belt for weighing an article on the moving conveyor belt. The conveyor scale assembly is comprised of a support means which contacts the underside of the moving conveyor belt and generates a friction force between the conveyor belt and the support means. Attached to the support means is a sensor which continuously measures the friction force and transmits data representing the measured friction force. Logic means for receiving and processing the representative data provides a weight for the article on the conveyor belt.

Due to its low resident mass, the conveyor scale is able to measure the moving package weight more rapidly than the other known weighing systems. This allows for reduced package spacing and increased conveyor belt speed, resulting in higher throughput.

It is an object of the invention to provide a high speed conveyor scale for weighing an article on a moving conveyor belt.

It is an object of the invention to provide a conveyor scale which determines the weight of a conveyor borne article based upon conveyor belt friction due to the article's weight.

DESCRIPTION OF THE PREFERRED EMBODIMENTS

The preferred embodiments will be described with reference to the drawing figures where like numerals represent like elements throughout.

Figure 1:
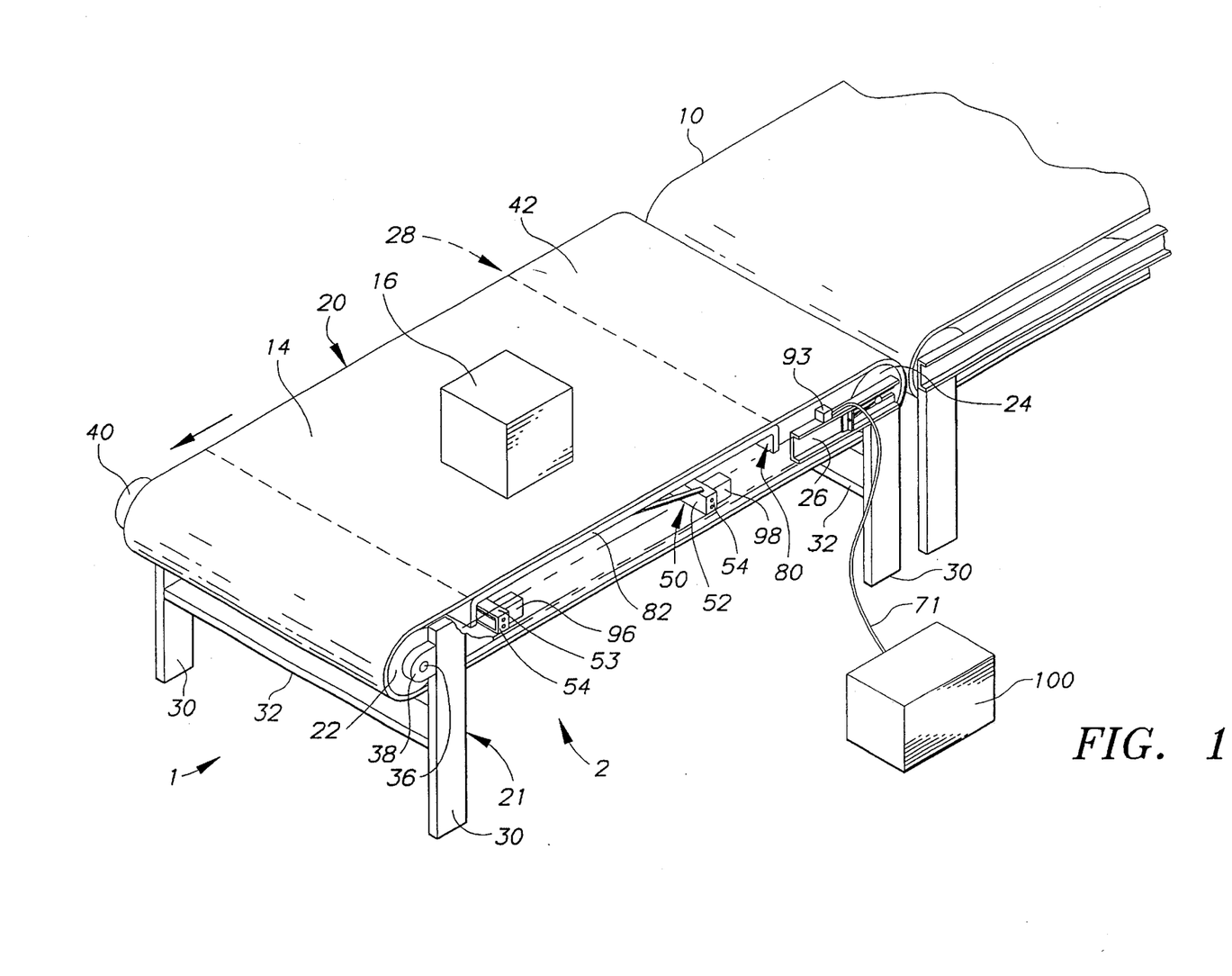
FIG. 1 is a perspective view of a conveyor assembly with a conveyor friction scale in accordance with the first embodiment of present invention.

A conveyor assembly 1 with a first embodiment of the conveyor friction scale assembly 2 in accordance with the present invention is shown in FIG. 1. The conveyor assembly 1 is comprised of a conveyor frame 20 upon which a conveyor belt 42 is mounted. A portion of side member 26 of the conveyor frame 20 has been removed to show the conveyor friction scale assembly 2 which is mounted in the space created between the upper and lower portions of the conveyor belt 42. The conveyor friction scale assembly 2 is comprised of a slider assembly 80 mounted on the slider support assembly 50. The conveyor scale assembly 2 contacts the underside of conveyor belt 42 in an area which is designated as the weigh area 14. A calibration unit 96 is in contact with underside of the lower portion of the belt 42 during its return run to allow continuous monitoring of the coefficient of friction of the belt 42.

The conveyor assembly 1 is fed articles by a feed conveyor 10. As an article 16 enters the weigh area 14, its presence is registered by a photoeye 93. The article's weight is then calculated by logic unit 100 based on the measured increase in friction force between the slider assembly 80 and the conveyor belt 42. The weight can be displayed and/or transmitted for further processing or storage. The conveyor assembly 1 then delivers the article 16 to the next section of conveyor (not shown) for further transport.

Figure 2:
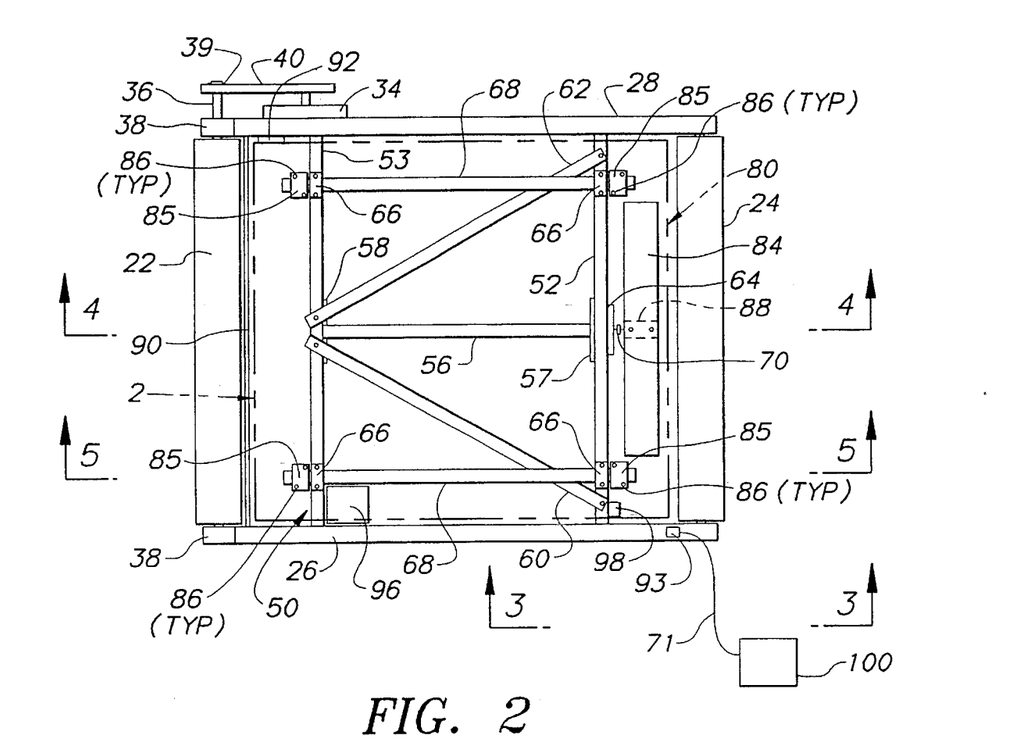
FIG. 2 is a plan view of the conveyor assembly.

The construction of conveyor assembly 1 will be known to those skilled in the art; therefore, only a brief explanation of its components follows with reference to FIGS. 1 and 2. The conveyor frame 20 is comprised of side members 26 and 28 which are supported by legs 30. Cross members 32 are connected between the legs 30 at each end. A drive roll 22 and an idler roll 24 are rotatably mounted at each end of the frame 20 and support the conveyor belt 42. The conveyor belt 42 is driven by drive roll 22. The drive roll 22 preferably has a crowned profile to help maintain the alignment of the conveyor belt 42. A drive shaft 36 protrudes from both ends of drive roll 22 and extends through bearings 38 mounted on opposite sides of the conveyor frame 20. A motor/gear box 34, mounted to the frame 20, is connected by a transmission means 40 to a gear 39 affixed to one end of the shaft 36. When power is provided to the motor/gearbox, drive roll 22 rotates and causes the conveyor belt 42 to advance. A tachometer 92, mounted on the frame 20, monitors the conveyor belt speed. A belt index photoeye 98, mounted on the frame 20, monitors one or more index marks on the belt 42 to provide the physical position of the belt 42.

Figure 3:
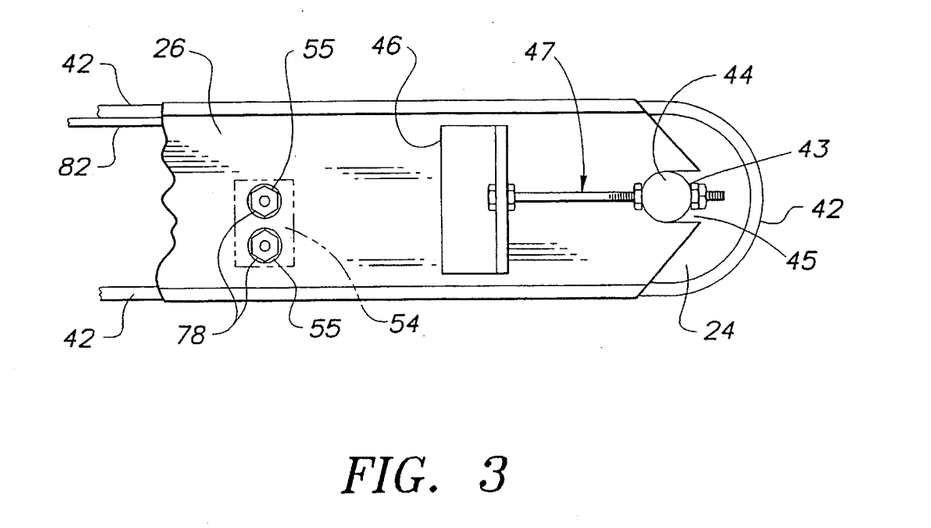
FIG. 3 is a side view taken along line 3—3 in FIG. 2.

As shown in FIG. 3, the idler roll 24 is mounted by a shaft 44 into notches 45 in side members 26 and 28 by an adjustable mounting system 47. This allows adjustment of the position of the idler roll 24 for tension and tracking of the conveyor belt 42.

Referring again to FIG. 2, the conveyor belt 42 has been removed for clarity and only the outline of the slider bed 82 has been indicated in order to reveal the details of the slider support structure 50. The slider support structure 50 is comprised of leading and trailing support channels 52 and 53 which extend between the side members 26 and 28 in the area defined between the advancing and returning portions of the conveyor belt 42. As shown in FIG. 3, end plates 54 are affixed to each end of channels 52 and 53 to provide a mounting surface. Apertures 55 extend through the side members 26 and 28 and the end plates 54. Fasteners 78 are installed through the apertures 55 to secure the support channels 52 and 53 in position.

Figure 4:
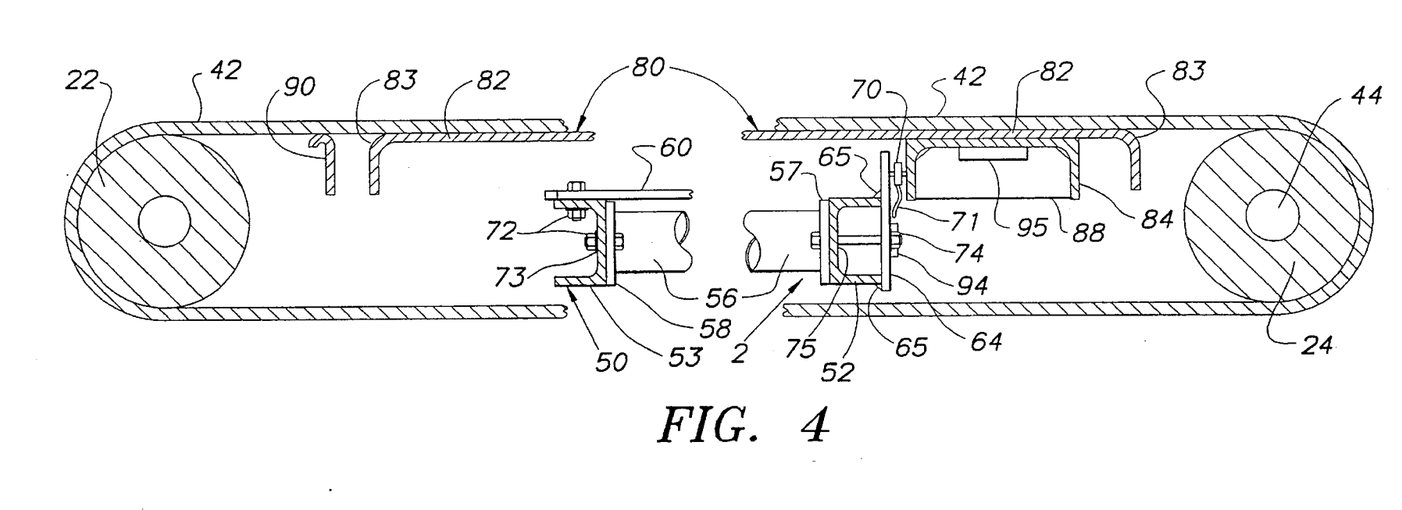
FIG. 4 is a section view taken along line 4—4 in FIG. 2.

As shown in FIG. 4, a center tube 56 with attached end plates 57 and 58 is installed at a medial position between the support channels 52 and 53. Fasteners 72 and 74 are installed through apertures 73 and 75 to secure the center tube 56 to the channels 52 and 53.

Referring again to FIG. 2, two tension straps 60 and 62 are connected between the support channels 52 and 53. The tension straps are attached to the trailing support channel 53 in close proximity to the center tube 56. The opposite ends of tension straps 60 and 62 are attached to the leading support channel 52 in close proximity to the respective side members 26 and 28.

Figure 5:
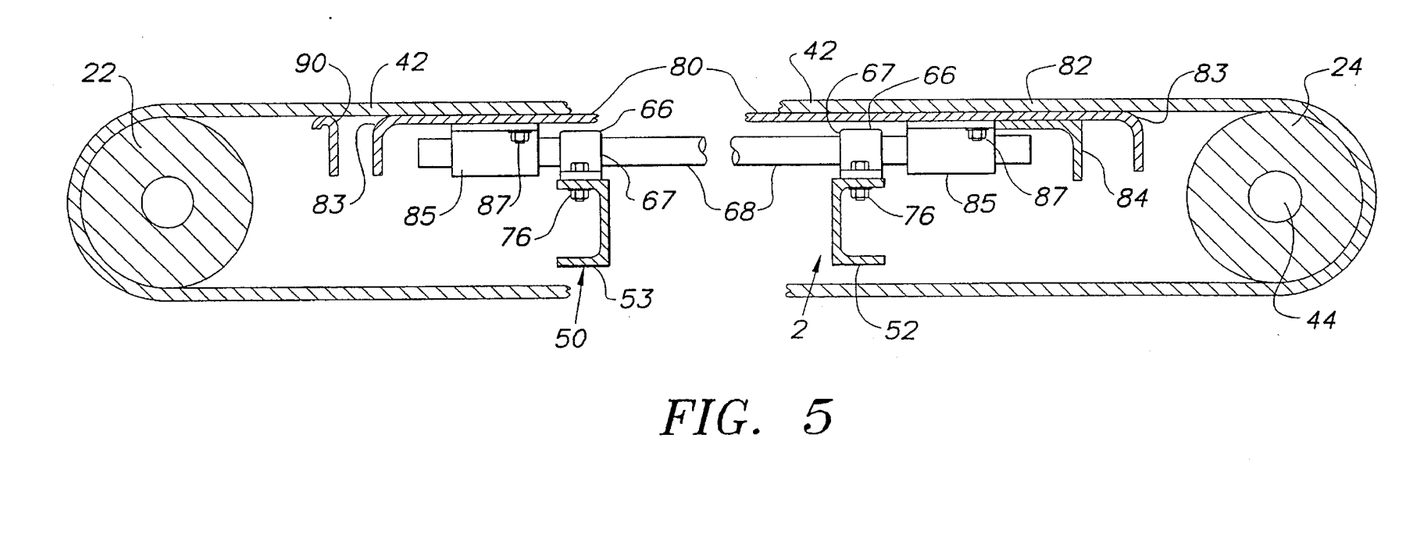
FIG. 5 is a section view taken along line 5—5 in FIG. 2.

Parallel guide shafts 68 are mounted between the support channels 52 and 53 adjacent to side members 26 and 28, in a plane above the support channels 52 and 53. As shown in FIG. 5, the guide shafts 68 are inserted through the apertures 67 in the mounting blocks 66 and clamped in position. The guide shafts 68 are preferably rigidly mounted to prevent any racking during movement of the slider assembly 80.

Referring now to FIG. 4, a load cell mounting plate 64 is attached to the front of the leading support channel 52 in a position opposite to the center tube 56. The mounting plate 64 is preferably attached by fillet welds 65 to form a box section with the support channel 52. The slider support assembly 50 is designed to minimize the deflection of the load cell mounting plate 64 when a load is applied. When a load is applied, it is transferred through the support channels 52 and 53 to the side members 26 and 28 where it is taken out in shear. The center tube 56 and the tension straps 60 and 62 minimize the deflection of the support channels 52 and 53 by transferring the load, as a compressive force in the tube 56 and as a tensile force in the straps 60 and 62, directly to the end portions of the leading support channel 52.

Referring again to FIGS. 4 and 5, the slider assembly 80 is shown in more detail. The slider assembly 80 is comprised of a slider bed 82 which is designed to span the width of the conveyor belt and have a length which is greater than that of the largest anticipated article dimension. In the first embodiment, the width is approximately 30 inches and the length is approximately 36 inches. Arcuate flanges 83 depend from the leading and trailing edges of the slider bed 82 to provide a smooth transition area for the conveyor belt 42. In the first embodiment, the slider bed 82 is made of 0.030 inch thick stainless steel. A channel 84 is affixed to the underside of the slider bed 82 in close proximity to the leading flange 83. The channel 84 provides additional rigidity to the slider assembly 80 to minimize deflection. A stiffener is installed in the channel 84 in a complementary position to the center tube 56 and the load cell mounting plate 64. Two pairs of linear bushing assemblies 85 are affixed to the bottom of the slider bed 82. The linear bushing assemblies 85 are attached with flush headed fasteners 87 which are installed through mounting apertures 86 in the slider bed 82 and the bearing assemblies 85. The linear bushing assemblies 85 are located in aligned positions with the guide shafts 68.

In the first embodiment, an optional nose bar 90 is installed between side members 26 and 28 in a position proximate to the drive roll 22. The nose bar keeps the conveyor belt 42 level across its width to provide uniform contact between the conveyor belt 42 and the slider assembly 80.

A load cell 70 is mounted between the load cell mounting plate 64 and the channel 84 in an aligned position with the center tube 56 and the stiffener 88. A preferred load cell 70 is Entran International part no. ELF-500-20. Conductors 71 connect the load cell 70 to the logic unit 100 to transmit the load cell signal.

In order to remove background noise induced by vibration from the load cell signal, accelerometers 94 and 95 are attached to the fixed support structure 50 and the slider bed assembly 80, respectively, to monitor the vibration of these components. The accelerometers 94 and 95 provide continuous signals to the logic unit 100 which correlates to the background noise. These signals are transmitted to the logic unit 100 through conductors 71 and are used to subtract out the noise from the load cell signal.

In theory, the coefficient of friction between the slider assembly 80 and the conveyor belt 42 remains constant. However, due to variations in the surface of the conveyor belt 42 and changes in temperature and humidity, this is not always accurate. Therefore, the accuracy of the conveyor friction scale assembly 2 is improved through the continuous calibration of the conveyor belt 42. This is accomplished through the use of a calibration unit 96, comprised of a known weight which is placed in continuous contact with the underside of the lower portion of the belt 42 during its return run and a load cell which measures the friction force between the known weight and the belt 42. The calibration unit 96 provides a signal to the logic unit 100 through conductors 71. Based on the known weight, the logic unit continuously monitors the coefficient of friction of the belt 42.

The photoeye 93, mounted at the front of the weigh area 14, indicates when an article enters the weigh area 14 when its beam is interrupted, and establishes the article's trailing edge as the article clears the beam. This information is sent to the logic unit 100 through conductors 71 to identify when the next article enters the weigh area.

Figure 6:
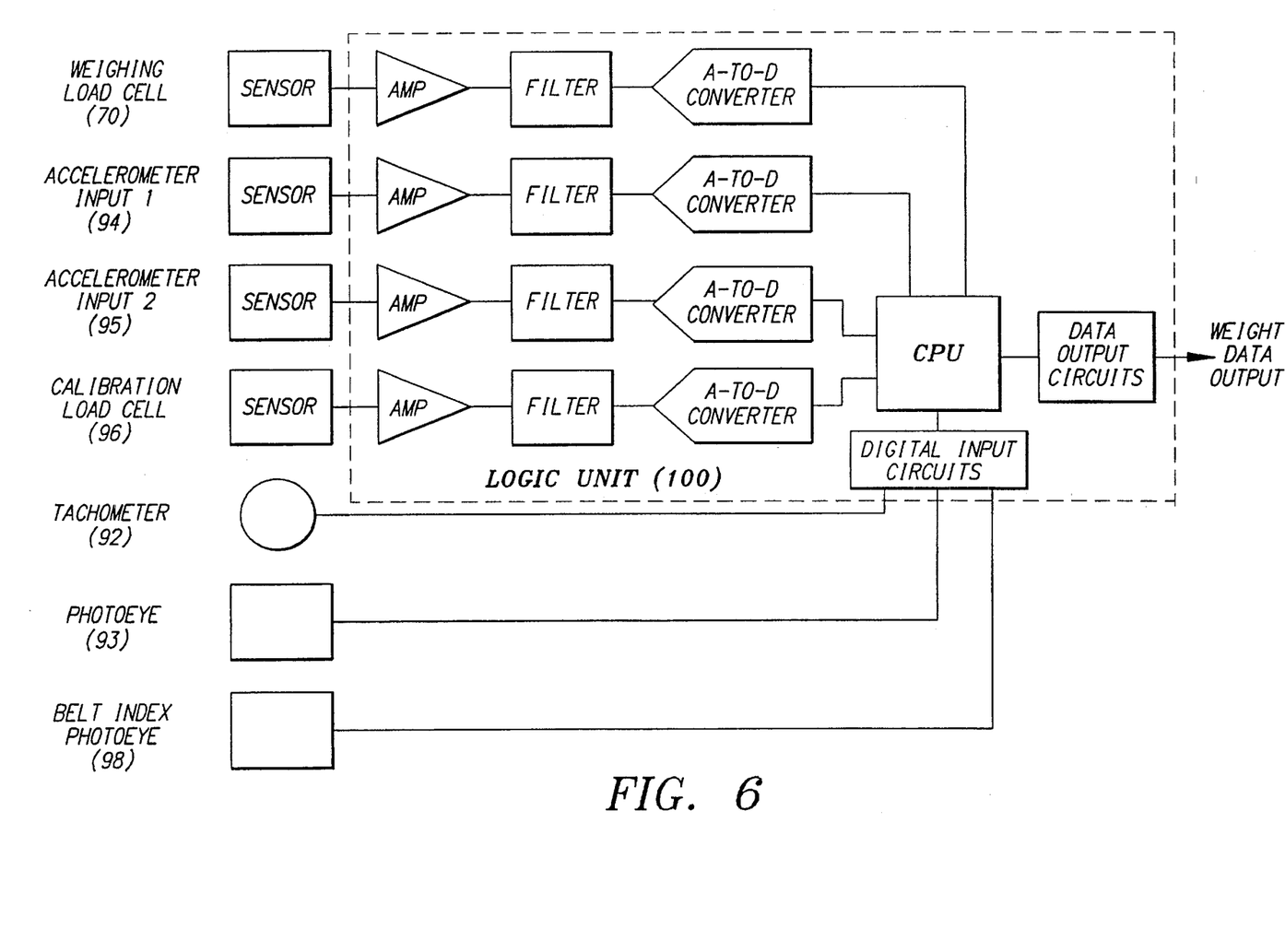
FIG. 6 is a block diagram of the logic unit.

As shown in FIG. 6, the logic unit 100 is comprised of analog input circuits, digital input circuits, a central processing unit, and data output circuits.

The analog circuits amplify and filter the signals received from the load cell 70, accelerometers 94 and 95, and the calibration unit 96. The conditioned signals are then sent to one or more analog-to-digital converters (A-TO-D) which sample the analog signal and output a binary representation of the signal level of the sample. The binary representations are then processed by the central processing unit (CPU).

Figure 7:
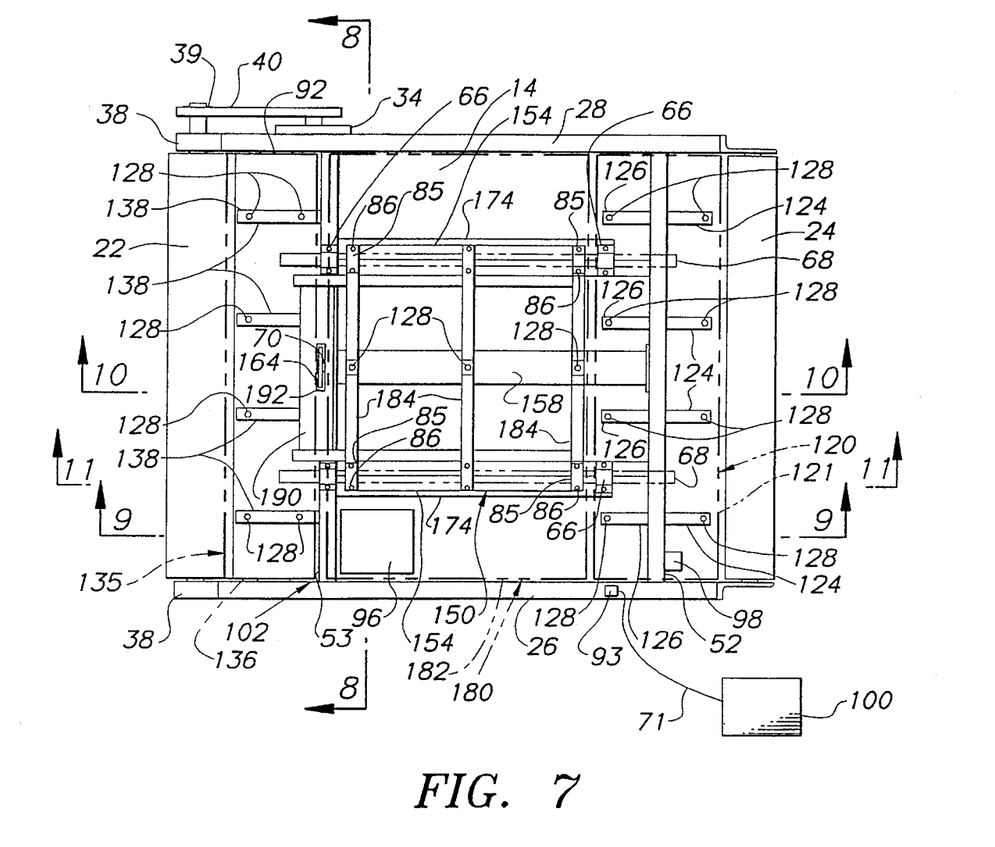
FIG. 7 is a plan view of a second embodiment of the second invention.

The digital input circuits buffer the signals received from the tachometer 92, the photoeye 93 and the belt index photoeye 98, shown in FIG. 7. These signals are then processed by the CPU.

The CPU is comprised of a microprocessor, random-access memory, and program storage memory. The CPU collects and analyzes the data from the load cell 70, the accelerometers 94 and 95, the calibration unit 96, the tachometer 92, the belt index photoeye 98, and the photoeye 93. The photoeye 93 identifies when the leading and trailing edges of an article pass into the weigh area 14. Based on the conveyor belt speed provided by the tachometer 92, the conveyor belt position provided by the belt index photoeye 98, the article length, position on the belt 42, and time in the weigh area 14 are known. The signal from the load cell 70 is proportional to the applied force. The applied force is a combination of: (a) the force due to the friction of the belt 42 moving against the slider bed 82, which is proportional to the weight of the belt 42 over the weigh area 14 plus the weight of the article 16; (b) the acceleration of the slider bed 82 relative to the frame 20 due to vibrations; and (c) the acceleration of the frame 20 relative to the article 16 due to vibration.

The CPU monitors the coefficient of friction between the belt 42 and the slider bed 82 for each area of the belt by collecting the data from the calibration unit 96, the tachometer 92 and the belt index photoeye 98. The forces measured by the accelerometers 94 and 95 are processed and subtracted from the force measured by the load cell 70. The result is then divided by the coefficient of friction for the portion of the belt 42 which is carrying the article 16. After subtracting the tare weight of the section of the belt 42 over the weigh area 14, the remainder is the weight of the article 16.

The data output circuits buffer the output of the CPU. The output weight data is typically transmitted to a display or to an external computer system for further processing.

Testing has indicated that there is an initial surge in the friction force as the article 16 enters the weigh area 14. The signal from the load cell also falls off as the article leaves the weigh area 14. The logic unit 100 filters out this data to provide more accurate friction force values for calculation of the article weight.

A second embodiment of the conveyor friction scale 102 is shown in FIGS. 7 through 11. In order to provide a clear view of the scale assembly 102, the belt 42 has been removed in FIG. 7, and the slider bed 182, the leading plate 121 and the trailing 136 are shown in phantom.

The second embodiment of the scale 102 is mounted in the space created between the upper and lower portions of the conveyor belt 42 and leading and trailing support channels 52 and 53 in similar fashion to the first embodiment 2. The second embodiment 102 utilizes a slider bed support assembly 150 with guide shafts 68 mounted through apertures 67 in mounting blocks 66 to support a slider bed assembly 180, similar to the first embodiment 2. Channels 157, mounted between the leading and trailing support channels 52 and 53, support the two mounting blocks 66 near the front end of the weigh area 14. The two mounting blocks near the back end of the weigh area 14 are mounted on the trailing support channel 53, similar to the first embodiment 2.

The slider bed assembly 180 functions in a similar manner to the first embodiment. Linear bushings 85 are mounted to the slider bed 182 using flush head screws 86. A slotted bar 190 is affixed to the trailing end of the slider bed assembly 180 to transmit the friction force to the load cell 70. The slotted bar 190 is supported by two channels 186 and 187 which are affixed to straps 184 by clips 188. The channels 186 and 187 are mounted parallel to the guide shafts 68.

Figure 10:
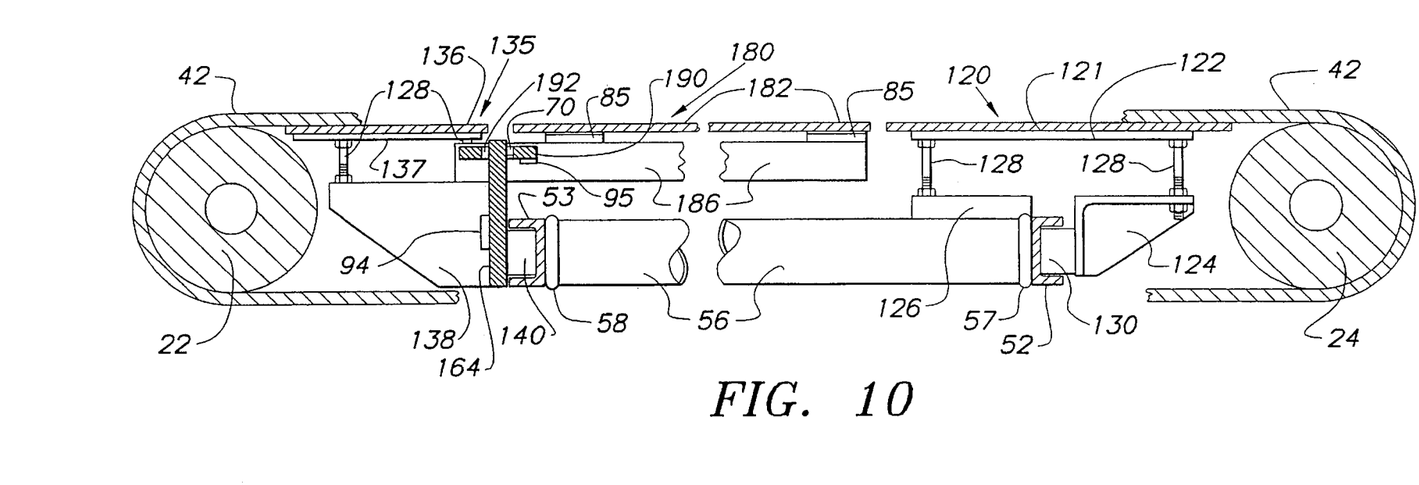
FIG. 10 is a section view taken along line 10—10 in FIG. 7.

In the second embodiment 102, the load cell 70 is mounted at the back or trailing end of the weigh area 14. As shown in FIG. 10, the load cell mounting plate 164 is affixed to the trailing support channel 53 opposite to center tube 56. The load cell 70 is mounted in the slot 192 in the bar 190 and affixed to the load cell mounting plate 164. Accelerometer 94 is mounted to the fixed slider bed support assembly 150 and accelerometer 95 is mounted to the slider bed assembly 180.

A leading fixed plate assembly 120 and a trailing fixed plate assembly 135 are mounted adjacent to the leading and trailing ends of the slider bed assembly 180 to provide a smooth transition for the belt 42 as it transitions to and from the weigh area 14. The leading and trailing plate assemblies 120 and 135 and the slider bed assembly 180 are all provided with profile adjusters 128 that allow the profile of the plates 121 and 136 and the slider bed 181 to be adjusted to closely match an ideal profile between the crowned drive roll 22 and the straight idler roll 24. In order to ensure a uniform surface profile, the thickness of the slider bed 181 is 0.120 inches. Plates 121 and 136 are also 0.120 inch thick stainless steel. The length of the slider bed 180 has been reduced to approximately 20 inches to accommodate closer article spacing.

Figure 9:
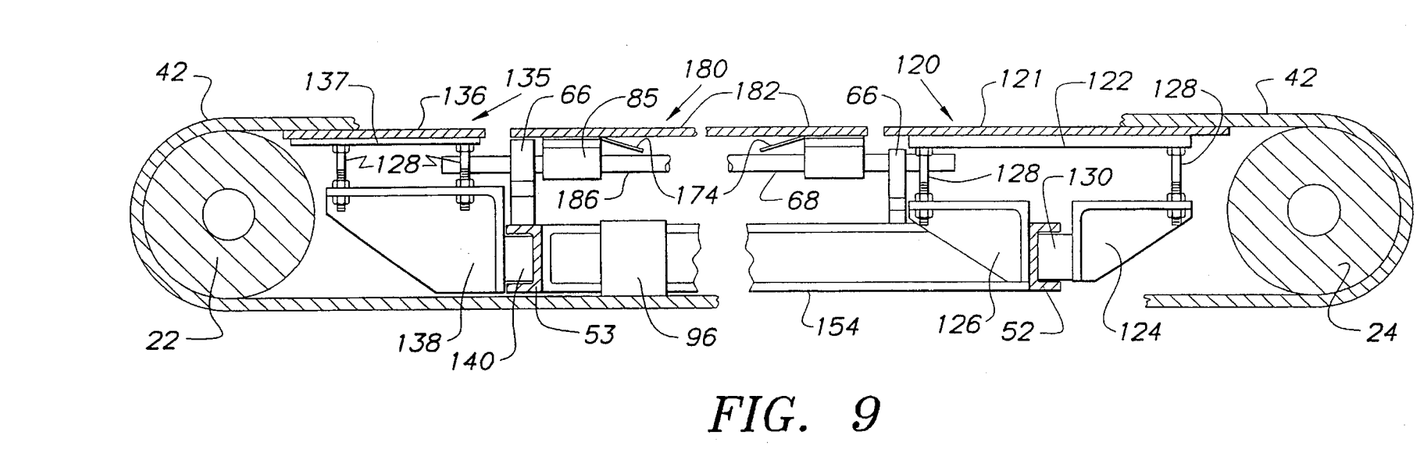
FIG. 9 is a section view taken along line 9—9 in FIG. 7.

As shown in FIGS. 7 and 9, the leading plate assembly 120 is comprised of a leading plate 121 which contacts the underside of the belt 42. Eight threaded profile adjuster assemblies 128, each comprised of a threaded rod and jam nuts, are affixed between the support angles 124 and 126 and the mounting plates 122 affixed to the bottom of the leading fixed plate 121. The angle brackets 124 and 126 are mounted at four locations along each side of the leading support channel 52. Spacer blocks 130 are used to facilitate the mounting of support angles 124 along the open side of the channel 52. By adjusting the profile adjusters 128, the profile of the leading fixed plate 121 can be adjusted to have a slight crown to provide a smooth and even transition for the belt 42 as it travels from the idler roller 24 toward the drive roller 22.

The trailing plate assembly 135 is comprised of trailing fixed plate 136. Threaded profile adjuster assemblies 128 are affixed between the support angles 138 and the mounting plates 137 affixed to the bottom of the trailing fixed plate 136. The angle brackets 138 are cantilevered from the trailing support channel 53. Spacer blocks 140 facilitate mounting of the angle brackets 138 on the open side of the channel 53. By adjusting the profile adjusters 128, the profile of the trailing fixed plate 136 can be adjusted to have a crown closely approximating the drive roller 22 to provide a smooth and even transition for the belt 42 as it travels from the idler roller 24 toward the drive roller 22.

Figure 8:
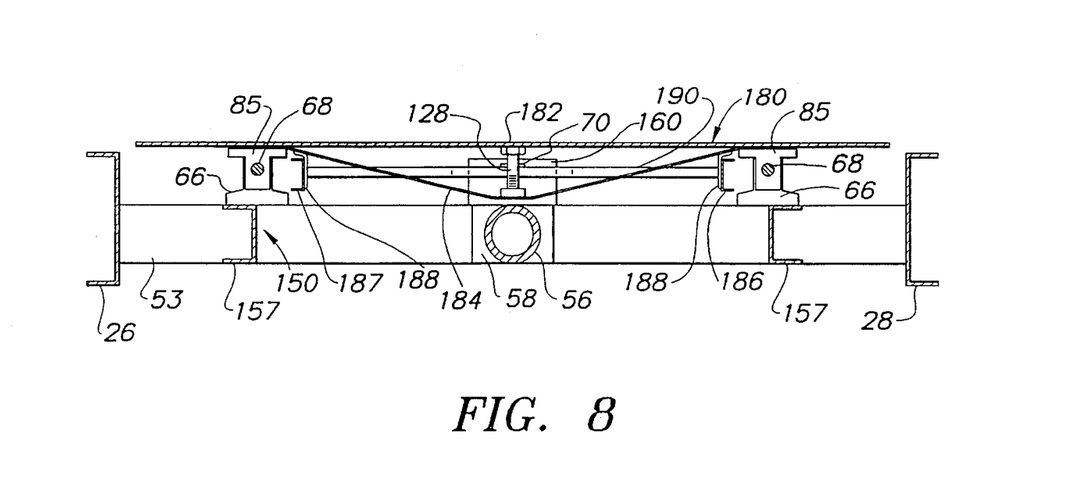
FIG. 8 is a section view taken along line 8—8 in FIG. 7.
Figure 11:
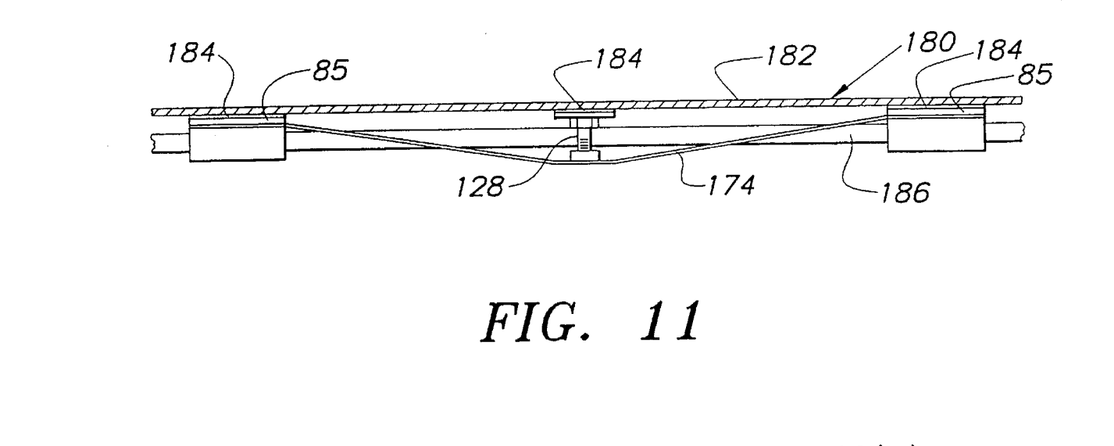
FIG. 11 is a section view taken along line 11—11 in FIG. 7.

Referring to FIGS. 7, 8 and 11, the profile adjustment means for the slider bed assembly 180 is shown. As shown in FIGS. 7 and 8, three cross direction straps 184 are affixed to the underside of the slider bed 181 between the leading and trailing pairs of linear bushings 85 and at a medial point between them. The straps 184 have a "U-shaped" profile, with the lower most portion of the "U" being along the centerline of the slider bed 181. Profile adjuster assemblies 128 are installed between the slider bed 181 and the lower most portion of the straps 184.

Referring to FIGS. 7 and 11, longitudinal straps 174 are shown. The longitudinal straps 174 are mounted on the underside of the slider bed 181 from the bases of the linear bushings 85, parallel to the guide shafts 68. The longitudinal straps 184 have a "U-shaped" profile, with the lower most portion of the "U" being at a medial position between the linear bushings 85. Profile adjuster assemblies 128 are installed between the slider bed 181 and the lower most portion of the longitudinal straps 174.

The profile adjusters 128 for the leading plate assembly 120, the slider bed assembly 180, and the trailing plate assembly 135 are all adjusted to provide a smooth and uniform path for the belt 42. This results in more uniform contact between the belt and the slider bed 181 across the entire width of the belt. This improves the performance of the friction scale 102 by providing a more consistent weight reading for an article, regardless of its placement along the width of the belt 42.

The second embodiment of the invention 102 utilizes the load cell 70, the tachometer 92, the photoeye 93, the accelerometers 94 and 95, the calibration unit 96, the belt index photoeye 98, and the logic unit 100 in the same manner as described in conjunction with the first embodiment 2 to provide the article weight.

Figure 12:
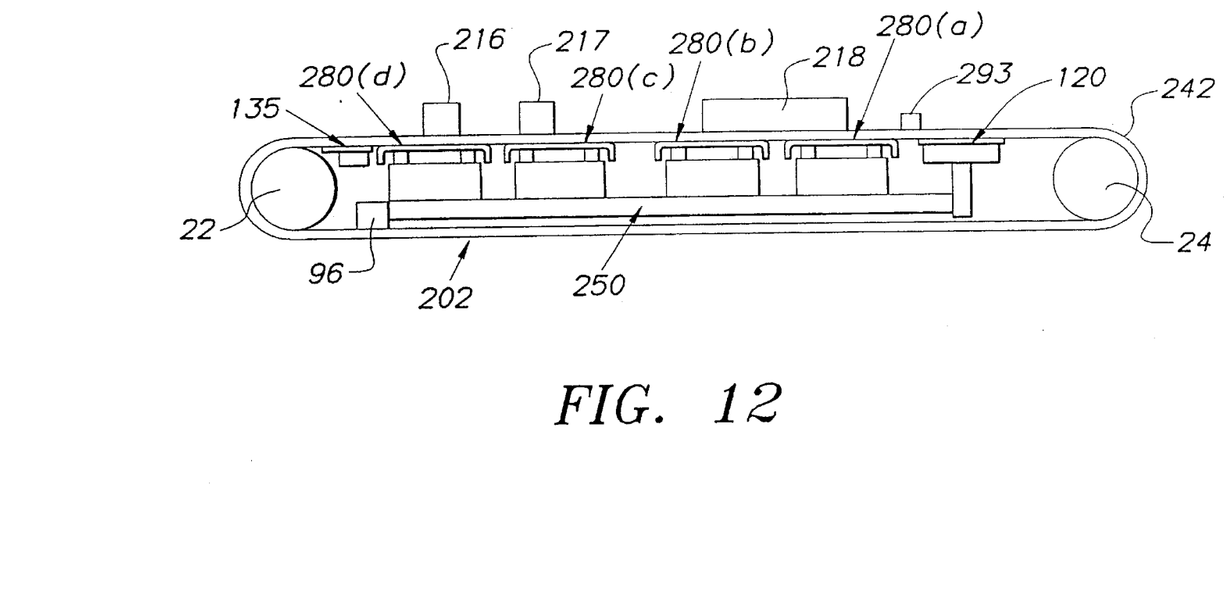
FIG. 12 is a schematic drawing of a section view of a third embodiment of the invention.

A side view of a third embodiment of the scale assembly 202 is shown in FIG. 12. In the third embodiment of the invention, multiple slider bed assemblies 280(a), (b), (c) and (d), each being similar to the slider bed assembly 180 of the second embodiment, are mounted in the space created between the upper and lower portions of a conveyor belt 242. A multiple slider bed support structure assembly 250 is used to support the slider bed assemblies 280(a–d). A separate load cell is associated with each slider bed assembly 280(a–d). The logic unit 100 incorporates additional inputs for the additional load cells, each input being similar to the input for the load cell 70 of the first embodiment. A photoeye 293 identifies the leading and trailing edges of articles as they enter the first weigh area over slider bed assembly 280(a). Based on the belt speed and position, provided to a logic unit by the tachometer 93 and the belt index photoeye 98, the logic unit 100 can calculate the weights of multiple articles 216, 217, on the same conveyor belt 242, allowing closer spacing of the articles and an overall higher throughput. Additionally, oversize articles 218 can be weighed using inputs from more than one slider bed assembly 280(a–d).

A fourth embodiment of the invention, similar to the first embodiment, utilizes strain gauges affixed to structural members of a fixed support means which contacts the underside of the conveyor belt. A friction force is generated between the fixed support means and the conveyor belt. The strain gauge detects the strain on the fixed support and provides strain data to the logic unit. The force is calculated from the strain data based on the known material properties. The force data is then processed in a similar manner to the load cell data of the first embodiment.

Although the conveyor friction scale has been described in terms of the preferred embodiments, it will be appreciated by those skilled in the art that additional embodiments of the conveyor friction scale assembly are within the scope of the present invention. Additional modifications, changes and substitutions may be made by one having ordinary skill in the art without necessarily departing from the spirit and scope of this invention.

We claim:

1. An improved combination of a conveyor scale assembly and a conveyor for weighing an article on a moving conveyor belt comprising:

support means which contacts the underside of the moving conveyor belt and generates a friction force;

sensor means attached to the support means which continuously measures the friction force and transmits data representing the measured friction force to a logic means; and logic means for receiving and processing the representative data to provide a weight for the article on the moving conveyor belt.

2. The improved combination of claim 1 further comprising calibration means which continuously transmits data representing a friction force for a known weight to the logic means, and tracking means which identifies the belt position and transmits belt position data to the logic means; the logic means calculates a coefficient of friction for each increment of the belt and provides the weight of the article on the belt based on the increment of the belt on which the article rests.

3. The improved combination of claim 2 further comprising noise suppression means for measuring forces acting on the scale due to induced vibration and transmitting data to the logic means representing the forces due to vibration; the logic means utilizes the vibration data to remove a noise component from the measured friction force data.

4. The improved combination of claim 1 wherein the sensor means is a load cell.

5. The improved combination of claim 1 further comprising a photoeye for sensing the presence of the leading and trailing edges of the article on the conveyor.

6. An improved combination of a conveyor scale assembly and a conveyor for weighing articles on a moving conveyor belt comprising:

multiple support means which contact the underside of the moving conveyor belt, each support means generates a friction force;

sensor means attached to each of the support means which continuously measure the friction force generated by each respective support means and transmit data representing the measured friction force to a logic means; and logic means for receiving and processing the representative data to provide weights for the articles on the moving conveyor belt.

* * * * *